US012793729B2

(12) United States Patent
Gomez

(10) Patent No.: US 12,793,729 B2
(45) Date of Patent: Nov. 10, 2026

(54) METHOD FOR AUDIO PROCESSING OF AN AUDIO SIGNAL CAPTURED BY A MICROPHONE

(71) Applicant: Sennheiser electronic SE & Co. KG, Wedemark (DE)

(72) Inventor: Juan Nicolas Franco Gomez, Berlin (DE)

(73) Assignee: Sennheiser electronic SE & Co. KG, Wedemark (DE)

( * ) Notice: Subject to any disclaimer, the term of this patent is extended or adjusted under 35 U.S.C. 154(b) by 28 days.

(21) Appl. No.: 18/985,563

(22) Filed: Dec. 18, 2024

(65) Prior Publication Data

US 2025/0225996 A1 Jul. 10, 2025

(30) Foreign Application Priority Data

Jan. 9, 2024 (DE) ......................... 102024100423.1

(51) Int. Cl.
*G10L 21/0216* (2013.01)
*G10L 21/0264* (2013.01)
*G10L 21/0208* (2013.01)

(52) U.S. Cl.
CPC ...... *G10L 21/0216* (2013.01); *G10L 21/0264* (2013.01); *G10L 2021/02082* (2013.01); *G10L 2021/02163* (2013.01)

(58) Field of Classification Search
CPC ........... H04S 7/305; H04S 7/301; G01H 7/00; H04R 29/00
See application file for complete search history.

(56) References Cited

U.S. PATENT DOCUMENTS

2018/0018984 A1* 1/2018 Dickins ............... G10L 21/0232

* cited by examiner

*Primary Examiner* — Kile O Blair
(74) *Attorney, Agent, or Firm* — Wolf, Greenfield & Sacks, P.C.

(57) ABSTRACT

A method is provided for audio post-processing of an audio signal captured by a microphone (200). The method comprises the following steps: determining reverberation properties of a room (100) by capturing a first audio signal as a test signal by at least one microphone (200) in the room and determining reverberation properties of the room (100) based on the captured first audio signals of the at least one microphone (200), capturing a second audio signal by a microphone (200) in the room, wherein the second audio signal comprises a useful sound and a room reverberation generated by the useful sound in the room, creating a prediction of a room reverberation based on the determined reverberation properties of the room and the captured second audio signal, analyzing the second audio signal for locations in the audio signal at which the level of the room reverberation is higher than a level of a useful signal in the second audio signal, outputting the second audio signal if the level of the room reverberation is lower than a level of the useful signal, and outputting the second audio signal at a reduced volume if the level of the room reverberation is higher than a level of a useful signal.

3 Claims, 2 Drawing Sheets

METHOD FOR AUDIO PROCESSING OF AN AUDIO SIGNAL CAPTURED BY A MICROPHONE

This application claims priority to German Patent Application No. 102024100423.1, filed Jan. 9, 2024, which is herein incorporated by reference in its entirety.

FIELD

The present invention relates to a method for audio processing of an audio signal captured by a microphone.

BACKGROUND

Microphones are used to capture an audio signal, in particular speech of a user. However, the microphone records both the speech signals of the user and ambient noise. However, for the most part this ambient noise is not desired in the captured audio signal.

In the priority application of this application, the German Patent and Trademark Office has searched the following documents: JP 2015-192256 A and US 2022/0201414 A1.

SUMMARY

It is therefore an object of the present invention to provide a method for audio processing of an audio signal captured by a microphone, which method enables improved capture of a useful signal (e.g., a speech signal) in an environment in which ambient noise is present.

This object is achieved by a method for audio processing of an audio signal according to claim 1.

A method is thus provided for audio post-processing of an audio signal that has been captured by a microphone. In this case, reverberation properties of a room can first be determined. This is accomplished by capturing a first audio signal as a test signal by at least one microphone that is located in the room. The reverberation properties of the room are determined based on the captured first audio signals of the at least one microphone. A second audio signal can be captured by the microphone in the room. The second audio signal comprises a useful sound and a room reverberation generated by the useful sound in the room. A prediction of a room reverberation is created based on the determined reverberation properties of the room and the captured second audio signal. The second audio signal is analyzed for locations at which the room reverberation has a higher level than a useful signal, in particular a speech signal. A volume of a second audio signal to be output is reduced at those locations at which the prediction of the room reverberation indicates that the room reverberation exceeds a threshold value. In other words, the volume of the second audio signal to be output is reduced depending on the room reverberation. In particular, if the useful signal in the second audio signal has a low level whilst the room reverberation has a high level, then the volume of the second audio signal to be output can be reduced in order to reduce the influence of the room reverberation on the entire second audio signal to be output. Depending on the room reverberation, the volume or level of the second audio signal to be output is reduced. At points where the useful signal (e.g. the speech signal) has a higher level than the room reverberation, the volume does not have to be reduced because the level of the useful signal exceeds the level of the room reverberation.

The useful signal can optionally be a speech signal or an audio signal generated by a user (e.g. singing). The useful signal represents the desired portion of the captured audio signal.

According to one aspect of the present invention, a measurement of linear properties of the system consisting of the room and the microphone can be carried out. This can be accomplished, for example, by means of an impulse response. Based on these measurements, a reverberation time of the room in which the microphone is located can be determined.

According to one aspect of the present invention, an algorithm is provided which follows the envelope curve of the input signal and detects transients and their volume or level.

According to one aspect of the present invention, the volume of the second audio signal to be output is reduced if it has been captured based on the algorithm that room reverberation and only a small proportion of useful signal are present in the audio signal. In particular, the volume can be reduced if the signal level of the reverberation is below a threshold value compared to the transient level.

According to one aspect of the present invention, a volume reduction can be carried out taking into account parameters which are captured by the measurement. In particular, the reverberation time can represent the attack time. In this way, the acoustic properties of the room can be parameterized in a manner analogous to noise gate processing.

The invention also relates to an audio post-processing unit for audio post-processing of an audio signal that has been captured by a microphone. In this case, reverberation properties of a room can first be determined. This is accomplished by capturing a first audio signal as a test signal by at least one microphone that is located in the room. The reverberation properties of the room are determined based on the captured first audio signals of the at least one microphone. A second audio signal can be captured by the microphone in the room. The second audio signal comprises a useful sound and a room reverberation generated by the useful sound in the room. A prediction of a room reverberation is created based on the determined reverberation properties of the room and the captured second audio signal. The second audio signal is analyzed for locations at which the room reverberation has a higher level than a useful signal, in particular a speech signal. A volume of a second audio signal to be output is reduced at those locations at which the prediction of the room reverberation indicates that the room reverberation exceeds a threshold value. In other words, the volume of the second audio signal to be output is reduced depending on the room reverberation. In particular, if the useful signal in the second audio signal has a low level whilst the room reverberation has a high level, then the volume of the second audio signal to be output can be reduced in order to reduce the influence of the room reverberation on the entire second audio signal to be output.

Further embodiments of the invention are the subject of the dependent claims.

BRIEF DESCRIPTION OF THE DRAWINGS

Advantages and exemplary embodiments of the invention are explained in more detail hereinafter with reference to the drawing.

DETAILED DESCRIPTION

Figure 1:
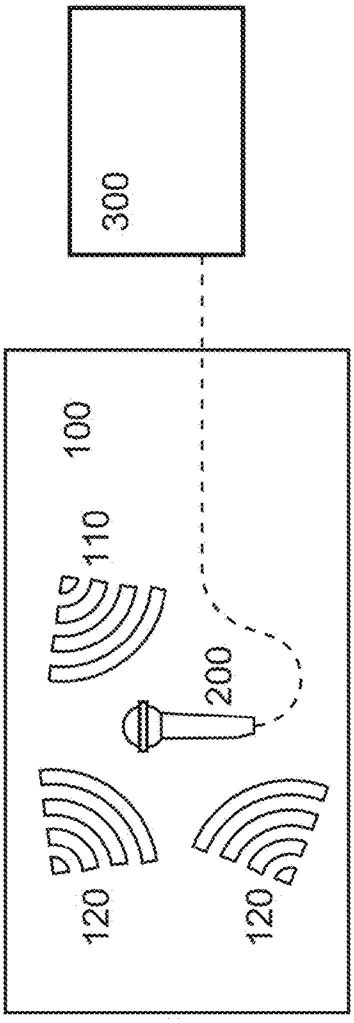
FIG. 1 shows a schematic representation of a room with a microphone.

FIG. 1 shows a schematic representation of a room with a microphone. At least one microphone 200 is provided in a room 100, which is intended to be used to capture a useful signal 110. When capturing the useful signal 110, however, the microphone 200 captures, for example, a room reverberation or reverberation 120 of the useful sound 110 due to the acoustic properties of the room 100. The audio signal recorded by the microphone 200 therefore consists of a useful sound 110 and a room reverberation 120. The room reverberation 120 is not desired in the recorded audio signal, since only the useful signal 110 is to be recorded.

To determine the room reverberation 120, a microphone (e.g. the microphone 200) can be placed in the room 100. An audio signal can then be output as a test signal in the room 100. The microphone 200 can then capture the test signal and the room reverberation generated thereby in order to be able to determine the room reverberation properties of the room 100.

The captured audio signal of the microphone 200 can be post-processed in an audio processing unit 300.

As long as the level of the room reverberation 120 is lower than the level of the useful sound 110, the influence of the reverberation sound 120 on the output signal is relatively small. Since the useful signal 110, for example a speech signal, does not occur uniformly, there may be points in the captured audio signal at which the useful sound 110 has a lower level than the room reverberation 120. In such cases, the room reverberation 120 then becomes noticeable in the captured audio signal. This is not desirable. In order to avoid this, it is proposed to reduce the level of the audio signal to be output (useful sound plus room reverberation) at those points at which the room reverberation 120 is above a threshold value. This is typically the case if the level of the useful sound 110 is lower than the level of the room reverberation 120 at this time. In these cases, the level of the audio signal (useful signal and room reverberation) can be reduced. This reduces the influence of the room reverberation 120 on the overall audio signal.

Figure 2:
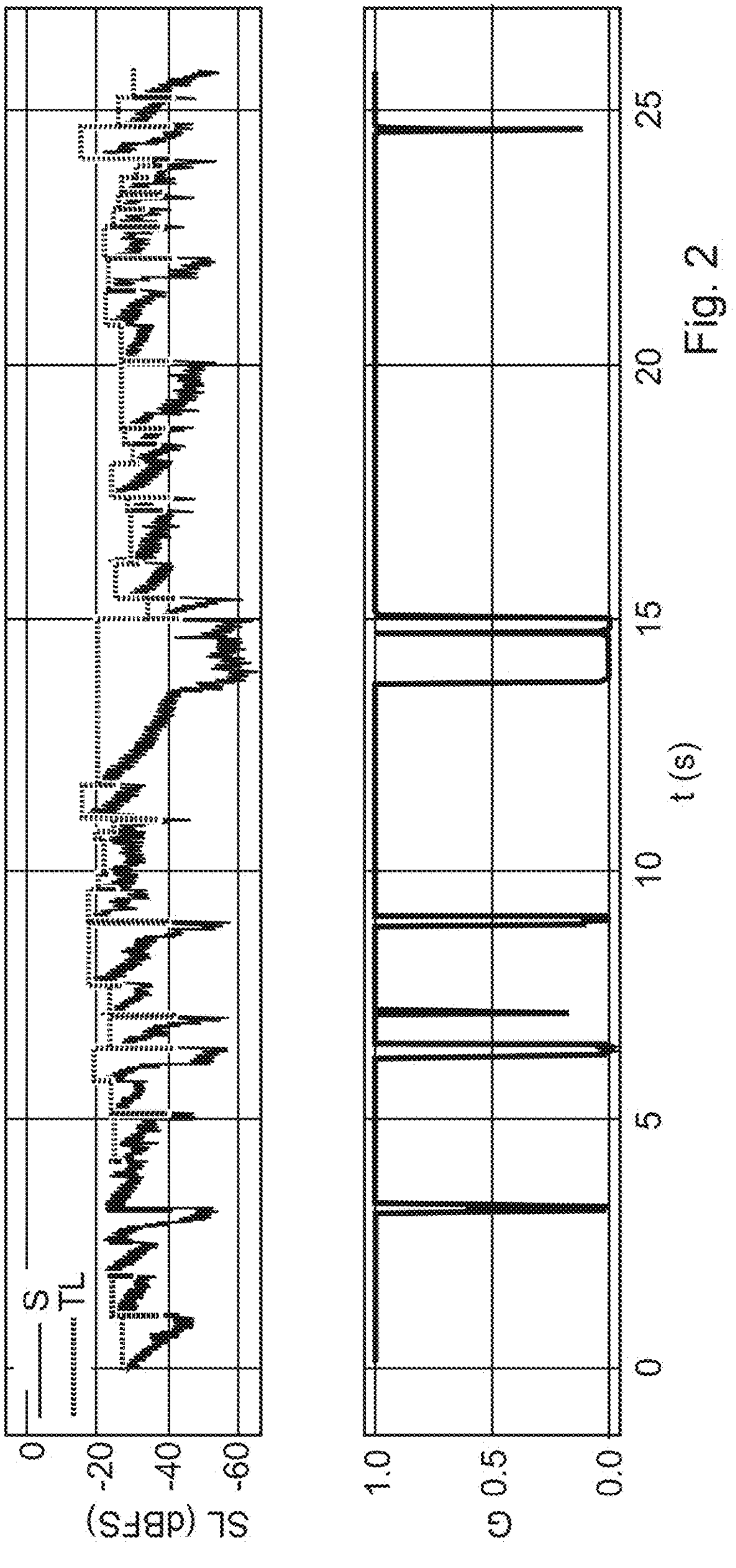
FIG. 2 shows a graph to illustrate a signal and a transient level and a gain according to an aspect of the present invention.

FIG. 2 shows a graph to illustrate a signal and a transient level as well as a gain according to an aspect of the present invention. In FIG. 2, the signal level SL of the signal S and the transient level TL are shown over time t. Furthermore, the gain G is shown over time t. In particular, the gain G of the audio signal S is reduced at some points. These points correspond to those points at which the room reverberation signal would be perceptible in the overall audio signal. The detection of these points can be carried out, for example, by a prediction. This prediction of the room reverberation can be carried out by capturing the room acoustics, for example by means of an impulse response through the microphone in the room (see FIG. 1).

FIG. 2 is merely intended to provide a better understanding of the audio post-processing used. FIG. 2 above shows the envelope curve of a signal S. In addition, the transient level TL extracted from the signal profile is shown. The transient level TL represents the current guideline value for the prediction of the algorithm. If the signal S falls below a level that is set in relation to the transient level, the existing signal S is assumed to be reverberation (i.e. not a useful signal). Immediately afterwards, the volume can be reduced. FIG. 2 (below) shows the control of the volume for the signal behaviour S. In some time sections, it is recognized that there is only room reverberation (e.g. reverberation) in the signal, and the volume is reduced accordingly. If the signal level increases again, the volume is brought back to a neutral level. The type and speed (i.e. "attack") of this reduction are determined by the acoustic room properties.

Figure 3:
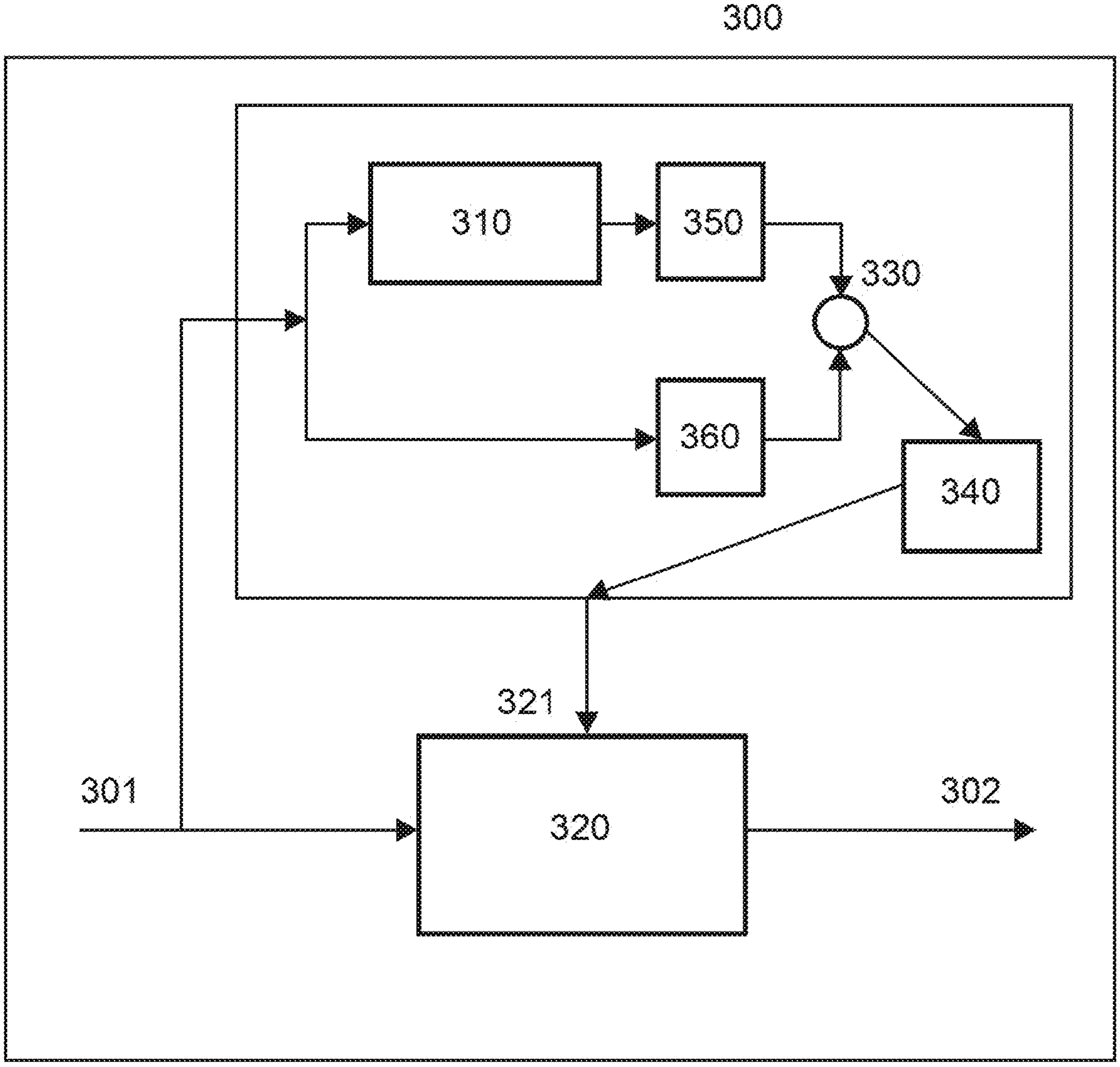
FIG. 3 shows a block diagram of an audio post-processing process.

FIG. 3 shows a block diagram of audio post-processing. The audio processing unit 300 has an input signal 301 and an output signal 302. The input signal 301 corresponds to the output signal 302 of the microphone 200. The audio processing unit 300 comprises a simulation unit 310 for simulating a room reverberation based on the audio signal captured by the microphone 200 (useful signal and room reverberation signal) and on the basis of the room reverberation properties (which have been captured by means of a test signal and are the basis for predicting room reverberation properties), a first volume unit 350 at the output of the simulation unit 310 and a second volume unit 360 with the audio input signal 301 as the input signal. The first and second volume units 350, 360 each serve to determine a volume. The output signal 302 of the first volume unit 350 is subtracted from the output signal 302 of the second volume unit 360 in a subtraction unit 330. In a comparison unit 340, the determined difference is compared with a threshold value.

The audio processing unit 300 further comprises a gate 320 with a side input 321. The gate 320 is controlled depending on the signal at the side input 321. Optionally, the gate 320 can decouple the output 302 from the input 301 so that no output signal 302 is output.

Optionally, the gate 320 can reduce a level of the input signal 301 if the signal at the side input 321 indicates that a level of a room reverberation is higher than a level of a useful signal.

REFERENCE LIST

100 Room
110 Useful signal
120 Room reverberation
200 Microphone
300 Audio processing unit
301 Input signal
302 Output signal
310 Simulation unit
320 Gate
321 Side entrance
330 Subtraction unit
340 Comparison unit
350 Volume unit
360 Volume unit

The invention claimed is:

1. A method for audio post-processing of an audio signal captured by a microphone, comprising the steps:

determining reverberation properties of a room by capturing a first audio signal as a test signal by at least one microphone in the room, and determining reverberation properties of the room based on the captured first audio signal of the at least one microphone, capturing a second audio signal by a microphone in the room, wherein the second audio signal comprises a useful sound and a room reverberation generated by the useful sound in the room, creating a prediction of a room reverberation based on the determined reverberation properties of the room and the captured second audio signal, analyzing the second audio signal for locations in the audio signal at which a level of the room reverberation is higher than a level of a useful signal in the second audio signal, outputting the second audio signal when the level of the room reverberation is lower than a level of the useful signal, and outputting the second audio signal at a reduced volume if the level of the room reverberation is higher than a level of a useful signal.

2. The method according to claim 1, wherein the first audio signal represents an impulse response.

3. Audio post-processing unit for audio post-processing of an audio signal captured by a microphone, wherein the audio post-processing unit is configured to determine reverberation properties of a room whereby a first audio signal is captured as a test signal by at least one microphone in the room, and reverberation properties of the room are determined based on the captured first audio signals of the at least one microphone, and is further configured to capture a second audio signal through a microphone in the room, wherein the second audio signal comprises a useful sound and a room reverberation generated by the useful sound in the room, to create a prediction of a room reverberation based on the determined reverberation properties of the room and the captured second audio signal, to analyse the second audio signal for locations in the audio signal at which a level of the room reverberation is higher than a level of a useful signal in the second audio signal, to output the second audio signal when the level of the room reverberation is lower than a level of the useful signal, and to output the second audio signal at a reduced volume if the level of the room reverberation is higher than a level of a useful signal.

* * * * *